(12) United States Patent
Cory

(10) Patent No.: US 6,877,793 B2
(45) Date of Patent: Apr. 12, 2005

(54) METHOD AND APPARATUS FOR REDUCING DRAG OF BLUNT SHAPED VEHICLES

(76) Inventor: George J. Cory, 230 W. Arroyo Ave., Ajo, AZ (US) 85321

( * ) Notice: Subject to any disclaimer, the term of this patent is extended or adjusted under 35 U.S.C. 154(b) by 58 days.

(21) Appl. No.: 10/193,947

(22) Filed: Jul. 10, 2002

(65) Prior Publication Data

US 2003/0011210 A1 Jan. 16, 2003

Related U.S. Application Data

(60) Provisional application No. 60/306,436, filed on Jul. 12, 2001.

(51) Int. Cl.[7] .............................................. B62D 35/00
(52) U.S. Cl. ............................... 296/180.1; 296/180.2; 296/180.4; 296/181.5
(58) Field of Search ........................ 296/180.1, 180.2, 296/180.4, 180.5, 181.5, 181

(56) References Cited

U.S. PATENT DOCUMENTS

| | | | | |
|---|---|---|---|---|
| 2,863,695 A | * | 12/1958 | Stamm | 296/180.1 |
| 3,711,146 A | * | 1/1973 | Madzsar et al. | 296/180.1 |
| 3,797,879 A | * | 3/1974 | Edwards | 296/180.1 |
| 3,834,752 A | * | 9/1974 | Cook et al. | 296/180.1 |
| 4,036,519 A | * | 7/1977 | Servais et al. | 296/180.1 |
| 4,451,074 A | * | 5/1984 | Scanlon | 296/180.1 |
| 4,915,441 A | * | 4/1990 | Nitzke | 296/180.2 |
| 5,280,990 A | * | 1/1994 | Rinard | 296/180.1 |
| 5,348,366 A | * | 9/1994 | Baker et al. | 296/180.4 |
| 6,286,892 B1 | * | 9/2001 | Bauer et al. | 296/180.4 |
| 2002/0030384 A1 | * | 3/2002 | Basford | 296/180.1 |

FOREIGN PATENT DOCUMENTS

| | | | | |
|---|---|---|---|---|
| DE | 003238211 A1 | * | 4/1984 | 296/180.1 |
| GB | 2275234 A | * | 8/1994 | 296/180.1 |

* cited by examiner

Primary Examiner—D. Glenn Dayoan
Assistant Examiner—Greg Blankenship
(74) Attorney, Agent, or Firm—Snell & Wilmer L.L.P.

(57) ABSTRACT

A method and apparatus for reducing the drag of a motor vehicle includes a mechanism for diverting air attached to a front portion of the vehicle and a vacuum plate having openings therein for attachment to a back of the vehicle. Mechanisms for diverting air include a cover piece encasing a front portion of the vehicle, one or more separation panels attached to the front of the vehicle, and one or more tubular members attached to the front of the vehicle. Both the cover piece and vacuum plate are attached to the vehicle so that a space is maintained between the vehicle and the cover piece and vacuum plate, respectively.

24 Claims, 9 Drawing Sheets

METHOD AND APPARATUS FOR REDUCING DRAG OF BLUNT SHAPED VEHICLES

CROSS REFERENCE TO RELATED APPLICATION

This application claims the benefit of, and priority to, provisional application Ser. No. 60/306,436, filed Jul. 12, 2001, which application is hereby incorporated by reference in its entirety.

FIELD OF INVENTION

The present invention generally relates to a method and apparatus for reducing the drag, and thereby the operating costs, of blunt shaped vehicles, and more particularly, to a method and apparatus which reduces or collapses the partial or complete vacuum that forms at the front edges and back of blunt vehicles as they move through an air block.

BACKGROUND OF THE INVENTION

Efforts to reduce the drag of a radial airplane engine by enclosing it in a cowling has been known in the art for some time. Further, efforts to reduce the drag of other types of motor vehicles such as cars and trucks have also been known in the art for some time. However, typical drag reducing devices for vehicles involve panels of some kind which are generally used to change the shape of the vehicle while it is in motion or when it exceeds a predetermined speed.

Typical drag reducing devices fail to employ a method to direct the air through a small space in order to manipulate the pressure of the air to reduce drag. Accordingly, there is a need for such a drag reducing device in order to decrease operating costs and increase the efficiency of a vehicle.

SUMMARY OF THE INVENTION

A principal object of the present invention is to provide an efficient and cost effective method and apparatus for reducing the drag that is created in blunt shaped vehicles when the vehicles are in motion thereby reducing their operating costs.

In accordance with one aspect of the present invention, an apparatus for reducing such drag includes a cover piece or cowling for encasing a front portion of a vehicle and a vacuum plate for attachment to the back or rear of the vehicle where the vacuum plate has multiple openings in it for air to pass through. The cover piece or cowling is preferably attached to the vehicle at a predetermined distance from the vehicle such that a space or opening is maintained between the cover piece and the vehicle so that air can pass through the space or opening. Moreover, the vacuum plate is also preferably attached to the back of the vehicle at a predetermined distance from the back of the vehicle so that an opening or space is maintained between the back of the vehicle and the vacuum plate.

In accordance with another aspect of the invention, other mechanisms for diverting air flow at the front of the vehicle may take the place of the cover piece or cowling. For example, one or more panels may be attached to the front portion of the vehicle for separating air mass. In another example, one or more tubular members may be attached to the front of the vehicle for diverting air flow.

In accordance with yet another aspect of the invention, a second vacuum plate having multiple openings may be attached to the vacuum plate at a predetermined distance from the vacuum plate so that an opening or space is maintained between the two vacuum plates. The openings in the vacuum plates may vary in size, shape, and configuration. Further, in an effort to provide an apparatus for reducing drag that can be easily attached and detached from a vehicle, a solid plate member having means for receiving the vacuum plate at a predetermined distance may be attached, either permanently or removably, to the back of the vehicle. In addition, the vacuum plates may be removably or permanently attached to one another at a spaced apart distance thereby allowing them to be attached to the back of the vehicle as one unit or as separate sheets for use either in combination or one at a time.

In accordance with still a further aspect of the invention, additional cover members may be attached to the front portion of a vehicle depending on the type and configuration of the vehicle. For example, a method and apparatus for reducing the drag of a semi-truck trailer may further include a second cover piece for attachment to a hood of the cab and a third cover piece for attachment to the top of the cab where the initial cover piece encasing a front portion of the vehicle is positioned to encase a front portion of the trailer. The second and third cover pieces are attached to the cab such that an opening or space exists between the cover pieces and the cab.

The present invention also includes a method for reducing the drag of a blunt shaped vehicle which includes the steps of attaching a mechanism for diverting air to a front portion of the vehicle, and attaching a vacuum plate having multiple openings therein to the back of the vehicle so that a space is created between the vacuum plate and the back of the vehicle.

The method and apparatus of the present invention provides an efficient and cost effective means for reducing the drag of blunt shaped vehicles. The method and apparatus of the present invention is low in cost to produce, will not require maintenance, and will increase gas mileage. Furthermore, little or no alteration is required to equip vehicles with the apparatus of the present invention and the apparatus may be utilized as an after market add on.

BRIEF DESCRIPTION OF THE DRAWINGS

Additional aspects of the present invention should become evident upon reviewing the non-limiting embodiments described in the specification taken in conjunction with the accompanying figures, wherein like numerals designate like elements, and.

DETAILED DESCRIPTION

The following descriptions are of exemplary embodiments of the invention only, and are not intended to limit the scope, applicability or configuration of the invention in any way. Rather, the following description is intended to provide a convenient illustration for implementing various embodiments of the invention. As will become apparent, various changes may be made in the function and arrangement of the elements described herein without departing from the spirit and scope of the invention. For example, though not specifically described, many shapes and orientations of the cover piece or cowling, the separation panels, the tubular members, the vacuum plate, and the openings in the vacuum plate, and alternative mechanisms for attaching the cover pieces and vacuum plates to a vehicle should be understood to fall within the scope of the present invention.

Figure 1:
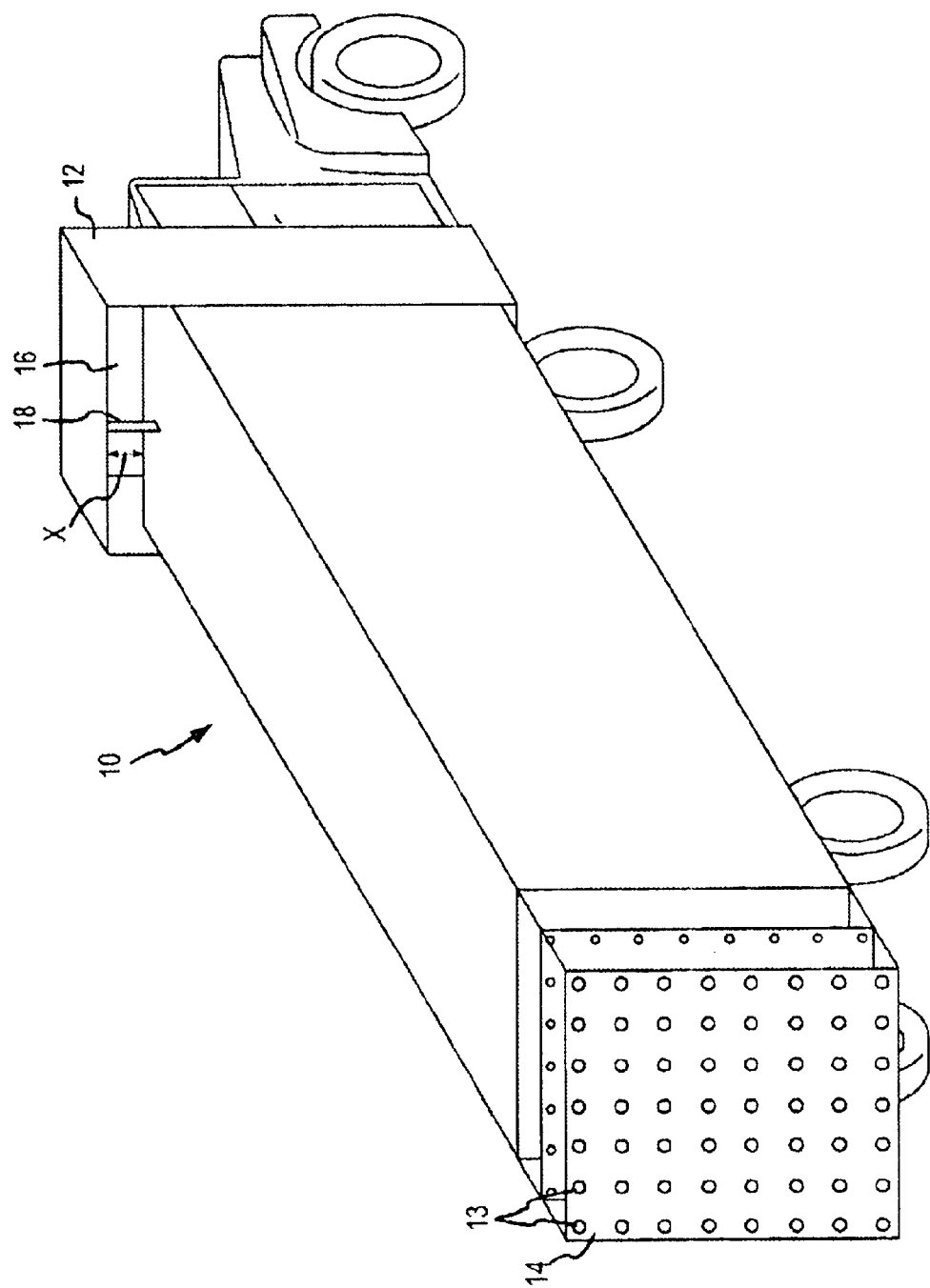
FIG. 1 is a top perspective view of an exemplary embodiment of the drag reducing apparatus of the present invention shown attached to a semi-truck trailer.

A perspective view of an exemplary embodiment of the drag reducing apparatus 10 of the present invention is shown attached to a vehicle is illustrated in FIG. 1. Drag reducing apparatus 10 includes a mechanism for directing air flow such as cover piece or cowling 12 and a vacuum plate 14 having a plurality of openings 13 therein which is attached to the rear of the vehicle. Cowling as used herein shall refer to any type of cover piece, hood, or enclosure which is capable of enclosing a portion of a vehicle. Cowling 12 is attached to a front portion of the vehicle, and in this illustration, it is attached to the front of a cargo trailer portion of a semi-truck trailer. Cowling 12 is attached to the vehicle at a predetermined distance X from the vehicle in order to maintain a space or opening between the top and sides of the vehicle.

Cowling 12 may be attached to the vehicle by bolting a bottom of cowling 12 to the underside of the vehicle and further adding one or more support bars 18 to ensure cowling 12 maintains its position leaving a space 16 between cowling 12 and the top and sides of the vehicle. Cowling 12 is preferably comprised of a rigid and durable material such as metal or hard plastic. Further, cowling 12 may comprise any shape or configuration to enable it to cover and/or conform to the edges, top and sides of a vehicle.

Figure 2:
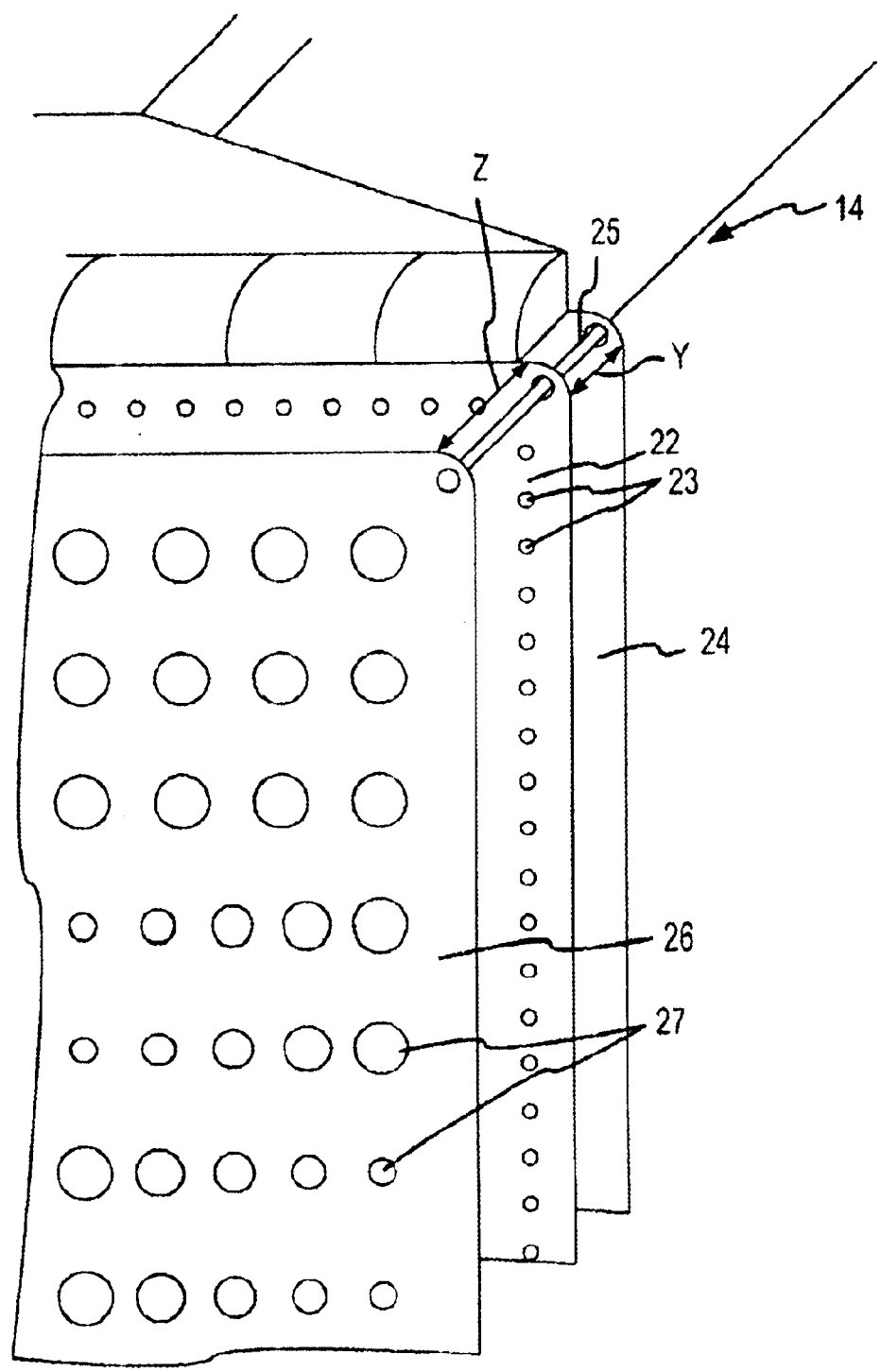
FIG. 2 is a partial perspective view of an exemplary embodiment of the vacuum plate of the drag reducing apparatus of the present invention shown in FIG. 1.
Figure 3:
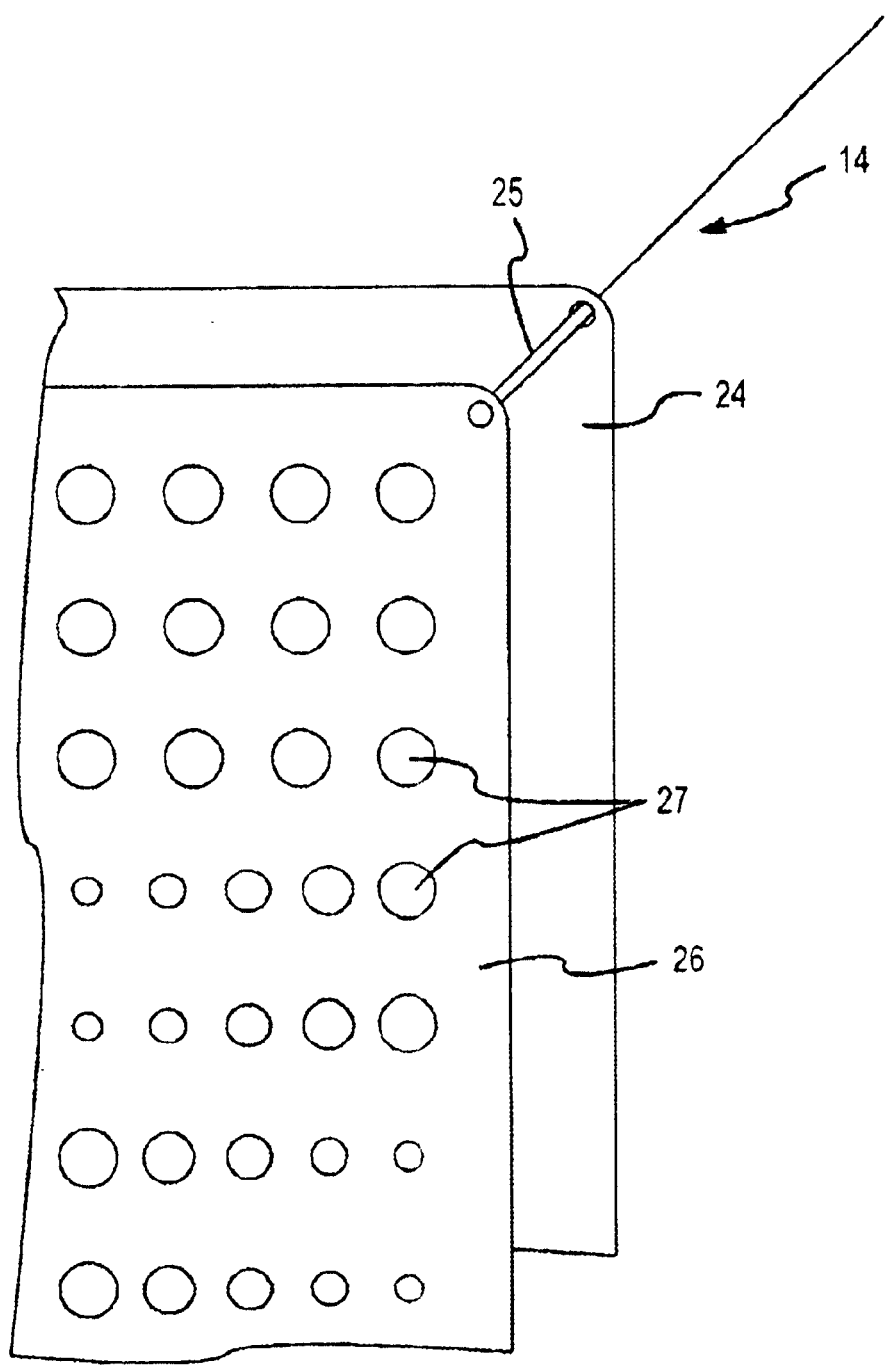
FIG. 3 is a partial perspective view of another exemplary embodiment of the vacuum plate of the drag reducing apparatus of the present invention.
Figure 3A:
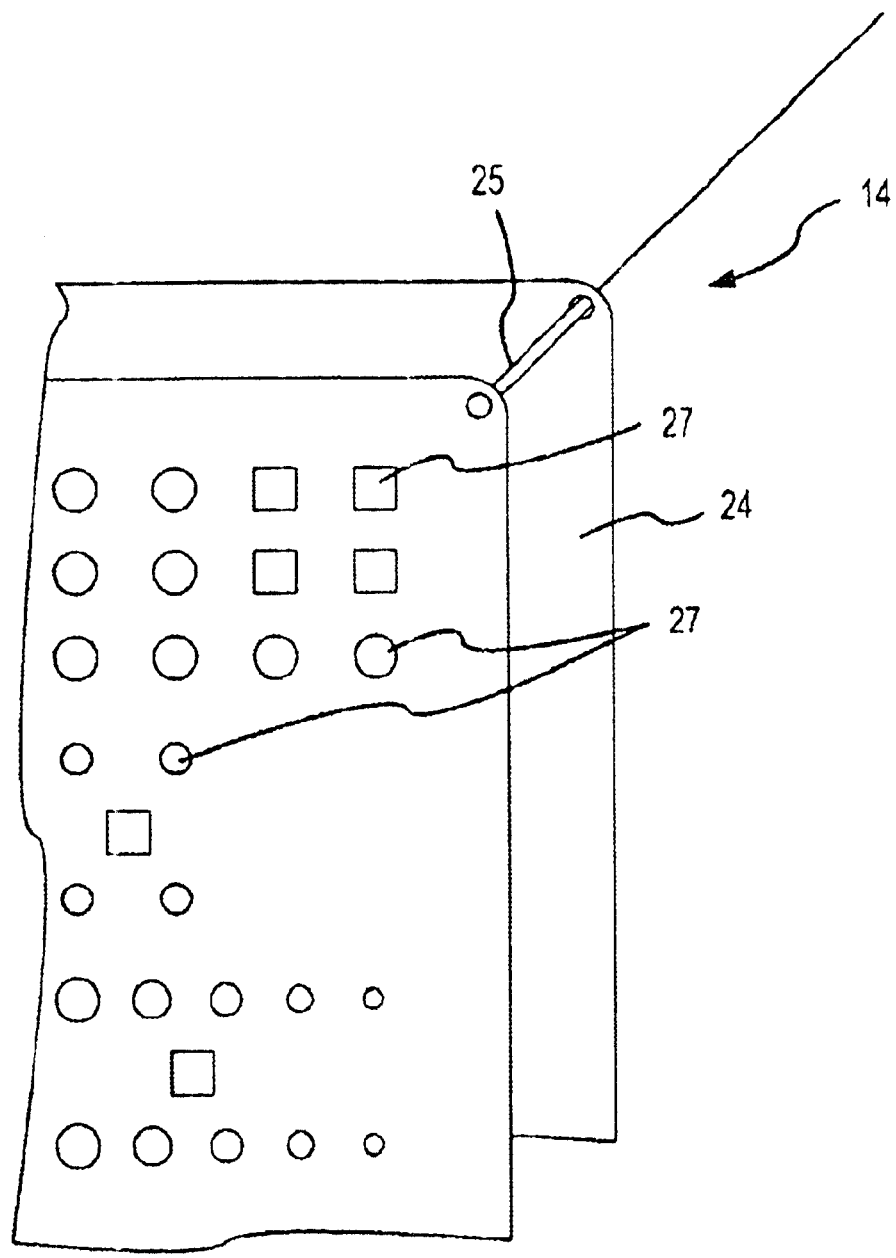
FIG. 3A is a partial perspective view of yet another exemplary embodiment of the vacuum plate of the drag reducing apparatus of the present invention.

Vacuum plate 14 may comprise different embodiments, examples of which are shown in FIGS. 2 and 3. The embodiment of vacuum plate 14 shown in FIG. 2 includes a first vacuum plate 22 having a plurality of openings 23 therein attached to a solid plate 24 which is in turn attached to the back of a vehicle at a predetermined distance Y from the vehicle in order to maintain a space or opening between the vehicle and first vacuum plate 22. Solid plate 24 may be attached to the back of the vehicle by a sliding and locking mechanism, a pin mechanism 25 and or any other similarly functioning mechanism known in the prior art for securely attaching one element to another. Similarly, first vacuum plate 22 may be connected to solid plate 24 either removably or permanently by those mechanisms known in the art for securely attaching one element to another.

In addition, vacuum plate 14 may further comprise a second vacuum plate 26 having a plurality of openings 27 therein attached to first vacuum plate 22. As with first vacuum plate 22, second vacuum plate 26 may be attached to first vacuum plate 22 either removably or permanently with connecting mechanisms known in the art. Second vacuum plate 26 is connected to first vacuum plate 22 at a predetermined distance Z from first vacuum plate 22 in order to maintain a space or opening between first and second vacuum plates 22 and 26. Solid plate 24 and first and second vacuum plates 22 and 26 are preferably comprised of a rigid and durable material capable of maintaining its shape such as a metal or hard plastic. Moreover, it should be understood by those in the art that first vacuum plate 22 may be attached directly to the back of a vehicle without the use of solid plate 24.

Another embodiment of vacuum plate 14 of the present invention is shown in FIG. 3. This embodiment includes only solid plate 24 and second vacuum plate having openings 27 therein for air to pass through. Either first or second vacuum plate 22 and 26 may be attached to sold plate 24 in this embodiment. Openings 23 and 27 in first and second vacuum plates 22 and 26, respectively, may be of any shape, size or configuration in order to control or manipulate air flow through the openings 23 and 27.

Figure 4:
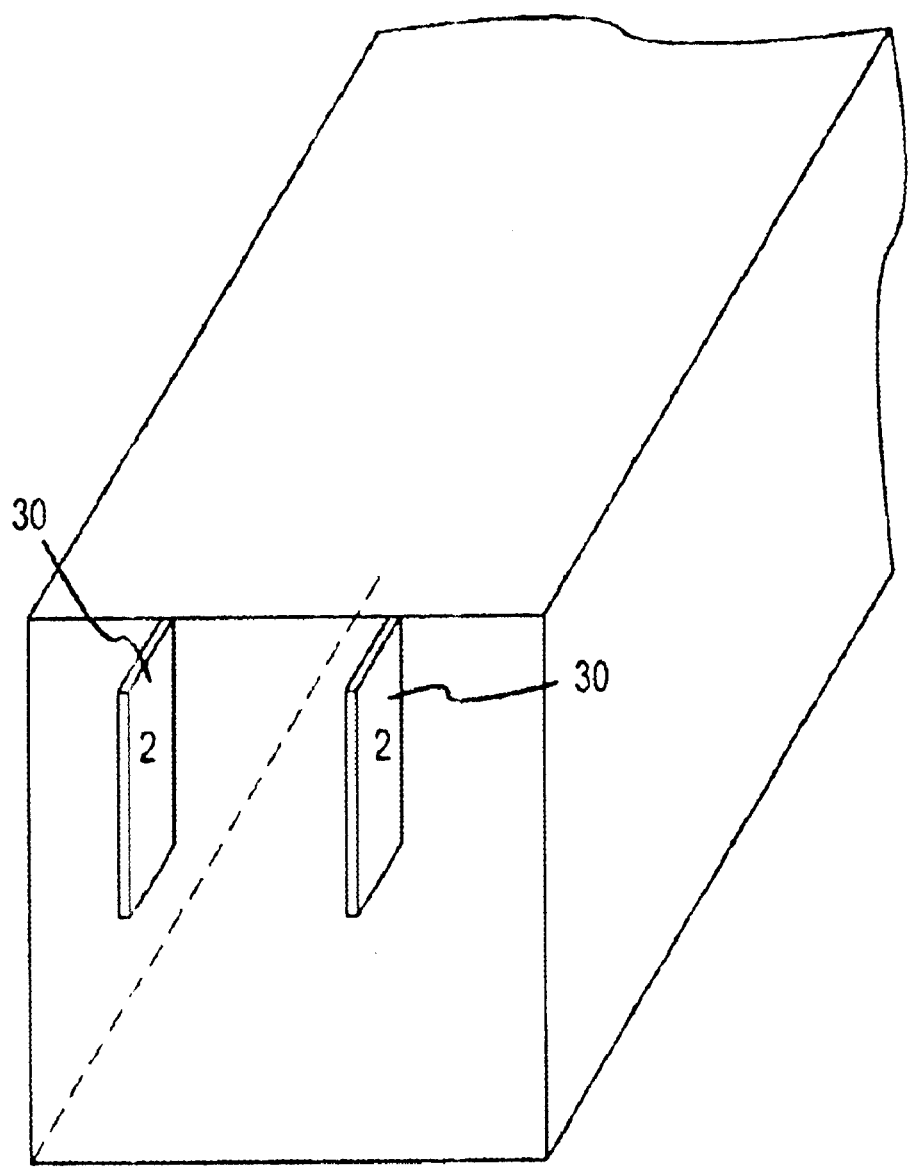
FIG. 4 is a perspective view of another exemplary embodiment of an air diverting mechanism of the drag reducing apparatus of the present invention shown attached to the front of a cargo box of a semi-truck trailer.
Figure 5:
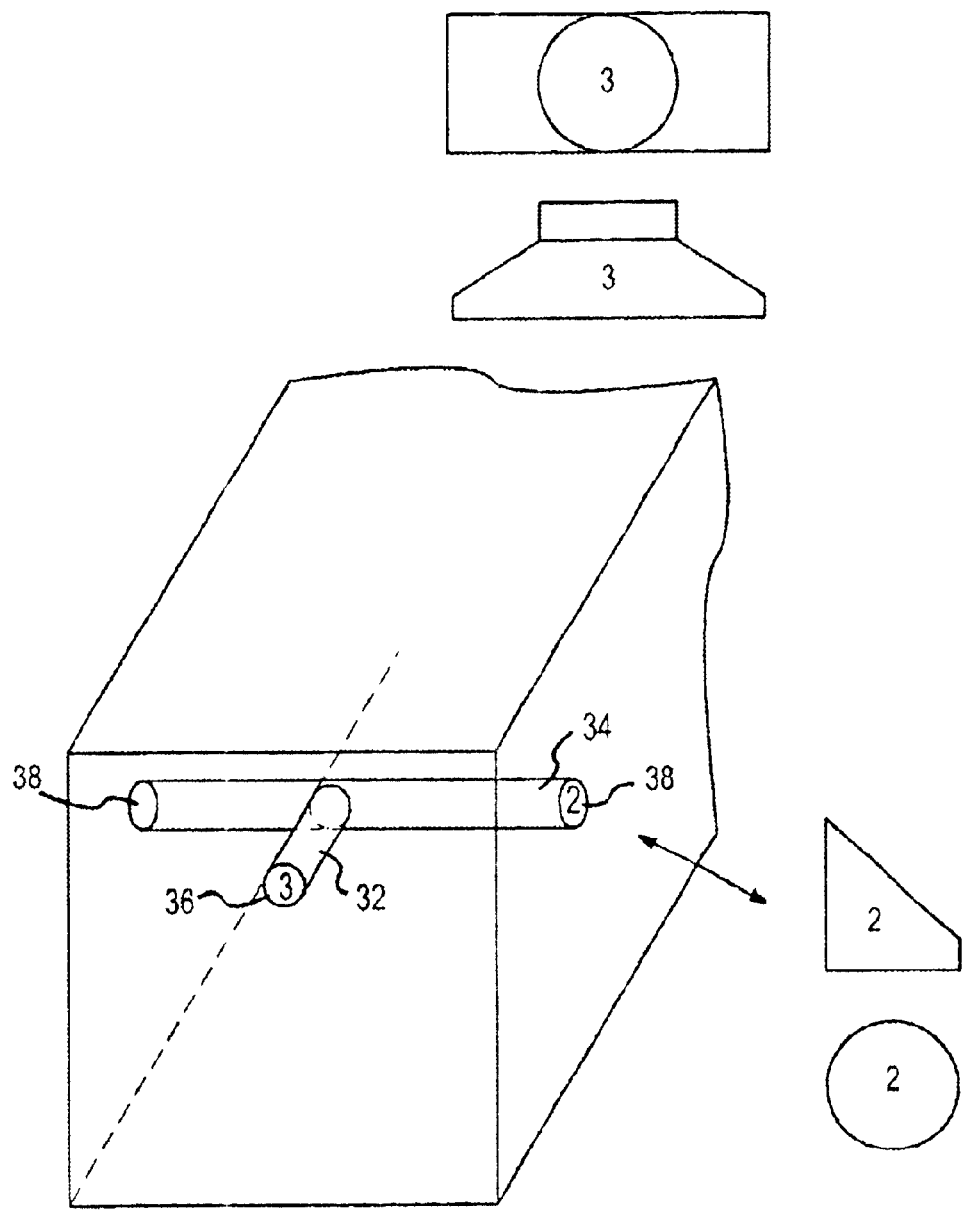
FIG. 5 is a perspective view of yet another exemplary embodiment of an air diverting mechanism of the drag reducing apparatus of the present invention shown attached to the front of a cargo box of a semi-truck trailer.

Turning now to FIG. 4, a perspective view of another exemplary embodiment of an air diverting mechanism of the drag reducing apparatus of the present invention shown attached to the front of a cargo box of a semi-truck trailer is illustrated. In this embodiment, the air diverting mechanism comprises at least one separation panel 30 attached perpendicular to the front of the vehicle. A pair of separation panels 30 are shown attached in FIG. 4. FIG. 5 shows yet another exemplary embodiment of an air diverting mechanism of the drag reducing apparatus of the present invention shown attached to the front of a cargo box of a semi-truck trailer. In this embodiment, the air diverting mechanism comprises at least one tubular member having at least one opening for receiving air and at least one opening for expelling air. The particular embodiment shown in FIG. 5 includes a first tubular member 32 attached to a second tubular member 34 wherein the interiors of tubular members 32 and 34 are in contiguous with one another. During movement of a vehicle, air enters opening 36 in tubular member 32 and exits through openings 38 in second tubular member 34. Tubular member 34 is attached to the front of a vehicle or cargo container as shown in FIG. 5. It will be understood by those skilled in the art that the present invention may include many different configurations of separation panels 30 and tubular members 32 and 34.

Figure 6:
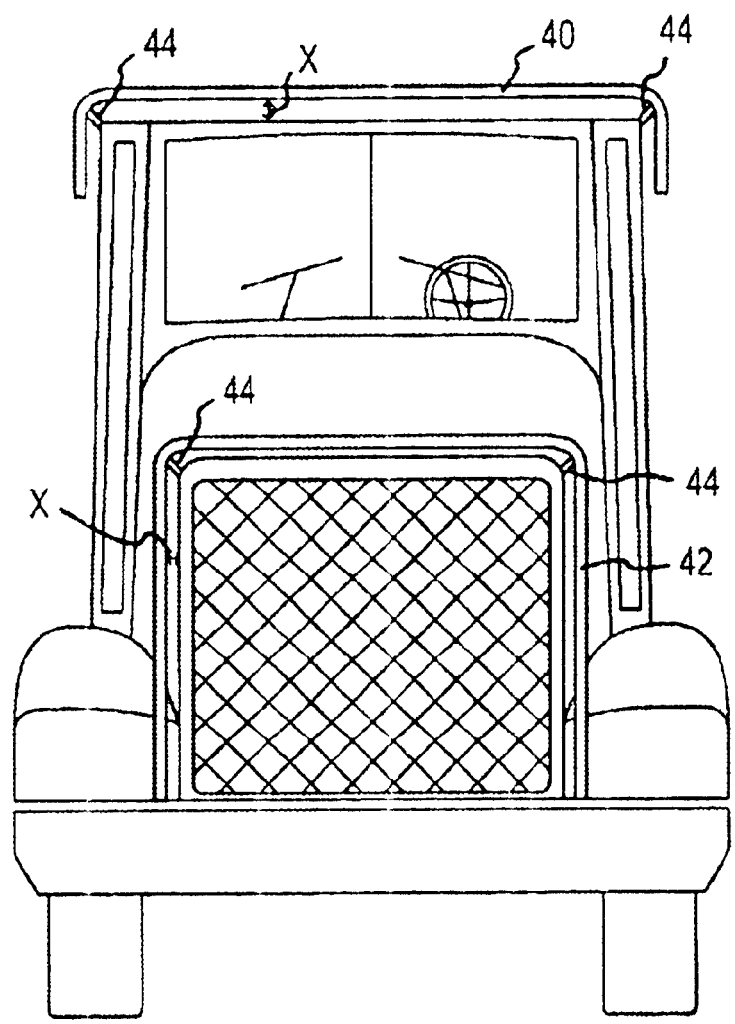
FIG. 6 is a front elevational view of the cab of a semi-truck trailer shown having still another exemplary embodiment of an air diverting mechanism of the drag reducing apparatus of the present invention attached thereto.

FIG. 6 is a front elevational view of the cab of a semi-truck trailer shown having still another exemplary embodiment of an air reducing mechanism of the drag reducing apparatus of the present invention attached thereto. FIG. 6 shows a second cover piece or cowling 40 attached to a top of the cab of a truck and a third cover piece or cowling 42 attached to the hood of the cab. Cowlings 40 and 42 are connected to the vehicle by support bars 44 which may be attached to both the vehicle and cowlings 40 and 42 by any conventional connection means known in the art for attaching one element to another. Cowlings 40 and 42 may be either permanently or removably attached to the vehicle. Furthermore, as with cowling 12 shown in FIG. 1, second and third cowlings 40 and 42 are attached to the vehicle at a predetermined distance X from the vehicle in order to maintain a space or opening between the vehicle and cowlings 40 and 42.

Figure 7:
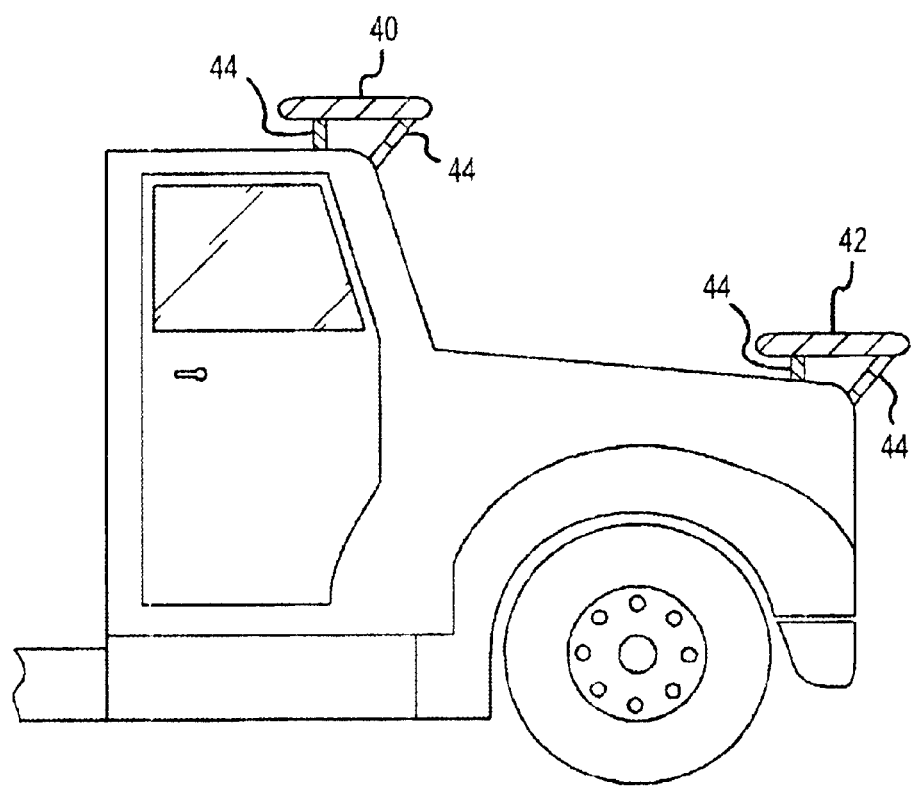
FIG. 7 is a side elevational view of the cab of the semi-truck trailer shown in FIG. 6.

A side elevational view of the cab of the semi-truck trailer shown in FIG. 6 is illustrated in FIG. 7. Cowlings 40 and 42 preferably comprise the configuration and materials previously described with reference to cowling 12 shown in FIG. 1 and are preferably attached to a vehicle so that they are adjustable, i.e. so that the angle at which they sit can be changed by moving cowlings 40 and 42 by hand.

Figure 8A:
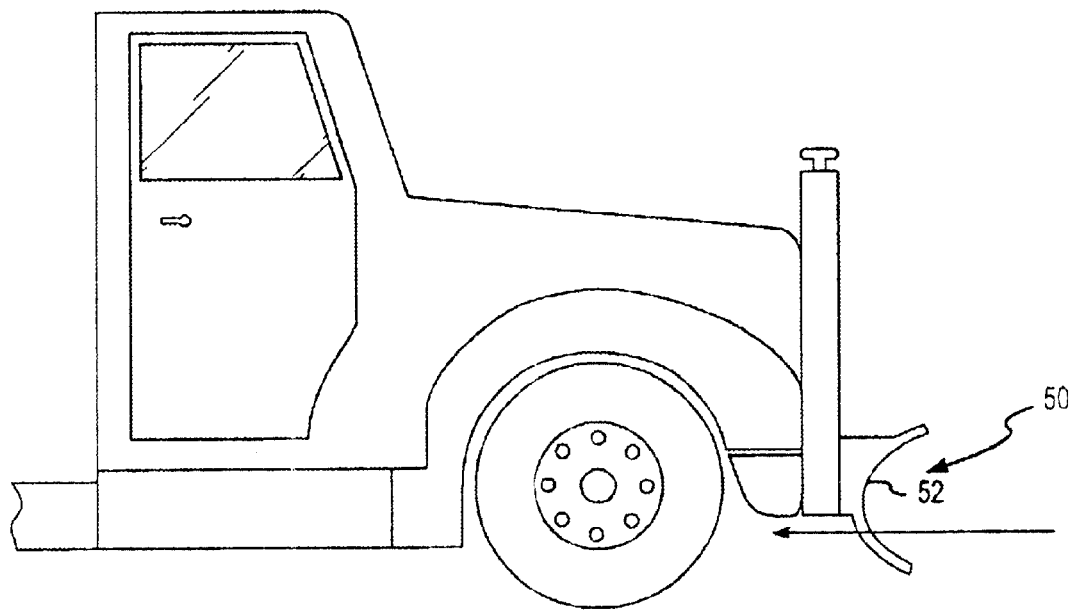
FIGS. 8A–8C show yet another embodiment of an air diverting mechanism of the drag reducing apparatus of the present invention.
Figure 8B:
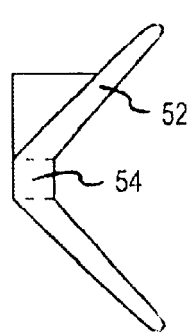
Figure 8C:
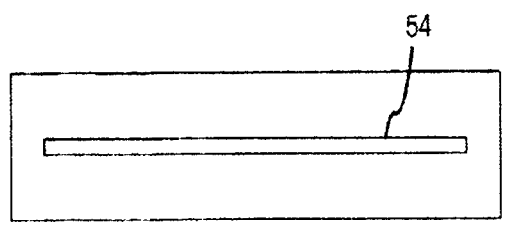

FIGS. 8A–8C show yet another embodiment of an air diverting mechanism of the drag reducing apparatus of the present invention. FIG. 8A is a side elevational view of the cab of a semi-truck trailer shown with the air diverting mechanism 50 attached to a front bumper of the cab. Air diverting mechanism 50 comprises a curved or angled plate 52 having a slit 54 as shown in FIGS. 8B and 8C. FIG. 8B is a cross sectional side view of air diverting mechanism 50 and FIG. 8C is a front elevational view of air diverting mechanism 50. Curved or angled plate 52 is preferably comprised of the same materials which comprise cowlings 40 and 42.

The exemplary embodiments of the drag reducing apparatus of the present invention employ Bernoulli's principle, namely that as velocity of air increases, its pressure decreases, to reduce the drag. Each of the exemplary embodiments explained herein are configured to require the air in front of a moving vehicle to move through a smaller space thereby increasing the velocity of the air. As the velocity of the air increases, the pressure of the air decreases thereby reducing drag on the vehicle.

It should be apparent that many alterations of the drag reducing apparatus embodiments described herein may be made. For example, cowlings 12, 40 and 42 and openings 23 and 27 may each comprise different shapes, sizes and configurations depending upon the vehicle for which the apparatus is intended.

Lastly, various aspects of the invention have been described in illustrative embodiments. Of course, many combinations and modifications of the above-described structures, arrangements, proportions, elements, materials and components, used in the practice of the invention, in addition to those not specifically described, may be varied and particularly adapted to specific environments and operating requirements without departing from those principles.

What is claimed is:

1. An apparatus for reducing drag of blunt shaped vehicles comprising:
   a mechanism for diverting air attached to a front of a vehicle; and
   a vacuum plate having a plurality of openings contained therein for allowing air to pass through wherein the vacuum plate is attached to a rear portion of the vehicle at a predetermined distance from said rear portion of the vehicle thereby forming an unenclosed space between the vacuum plate and said rear portion of the vehicle.

2. The apparatus of claim 1 wherein said mechanism for diverting air comprises an enclosure which encases a front portion of the vehicle without contacting a top or a side of the vehicle and at least one support bar connecting the enclosure to the vehicle.

3. The apparatus of claim 2 wherein said enclosure is square or rectangular in shape in order to fit over a front portion of a trailer portion of a semi-truck trailer.

4. The apparatus of claim 1 wherein said plurality of openings vary in at least one of size, shape, and configuration.

5. The apparatus of claim 1 wherein said vacuum plate comprises a first solid plate attached to the rear portion of the vehicle and a second plate having a plurality of openings therethrough attached to said first solid plate at a predetermined distance from said first solid plate.

6. The apparatus of claim 5 wherein said plurality of openings vary in at least one of size, shape, and configuration.

7. The apparatus of claim 5 further comprising a third plate having a plurality of openings therethrough attached to said second plate at a predetermined distance from said second plate.

8. The apparatus of claim 7 wherein said plurality of openings in said third plate vary in at least one of size, shape, or configuration.

9. The apparatus of claim 1 wherein said mechanism for diverting air comprises at least one separation panel perpendicularly attached to the front of the vehicle.

10. The apparatus of claim 1 wherein said mechanism for diverting air comprises at least one tubular member having at least one opening for receiving air and at least one opening for expelling air.

11. The apparatus of claim 1 wherein said mechanism for diverting air comprises an enclosure located above a roof of said vehicle which encases a portion of the vehicle without contacting a top or a side of the vehicle, at least one support bar connecting the enclosure to the vehicle, and a cover piece for covering at least a portion of a hood of said vehicle attached to said hood at a predetermined distance from said hood thereby creating an opening between said covering piece and said hood.

12. The apparatus of claim 1 wherein said mechanism for diverting air comprises an enclosure which encases a front portion of a trailer portion of a semi-truck trailer such that an opening exists between the enclosure and a top and sides of said trailer, a first cover piece for covering at least a portion of a hood of a cab portion of said semi-truck trailer, and a second cover piece for covering at least a portion of a hood of said cab.

13. The apparatus of claim 12 wherein said first and second cover pieces are attached to said cap at a predetermined distance from said cab thereby creating an opening between said cab and each of said first and second cover pieces.

14. An apparatus for reducing drag in a blunt shaped vehicle comprising:
   a cowling for encasing at least a front portion of said vehicle such that an opening can be maintained between said cowling and a top and sides of said vehicle; and
   a vacuum plate having a plurality of openings contained therein for allowing air to pass through wherein said vacuum plate is capable of being attached to a rear portion of said vehicle at a predetermined distance from said vehicle thereby creating an unenclosed opening between said vacuum plate and said vehicle.

15. The apparatus of claim 14 wherein said plurality of openings vary in at least one of size, shape, and configuration.

16. The apparatus of claim 14 further comprising a second vacuum plate having openings therein for allowing air to pass through wherein said second vacuum plate is attached to said first vacuum plate at a predetermined distance from said first vacuum plate thereby creating a space between said first and second vacuum plates.

17. The apparatus of claim 16 wherein said plurality of openings in said second vacuum plate vary in at least one of size, shape, and configuration.

18. A method for reducing drag in a blunt shaped vehicle comprising the steps of:

attaching a mechanism for diverting air to a front of the vehicle; and attaching a vacuum plate having a plurality of openings therein to a back of said vehicle such that an unenclosed space is created between the vacuum plate and the back of said vehicle.

19. The method of claim 18 wherein said step of attaching a mechanism for diverting air comprises the step of enclosing at least a front portion of said vehicle with a covering such that an opening exists between said covering and said vehicle.

20. The method of claim 18 further comprising the step of varying at least one of a size, a shape, and a configuration of said plurality of openings.

21. The method of claim 18 further comprising the step of attaching a second vacuum plate having a plurality of openings therein to said vacuum plate at a predetermined distance from said vacuum plate thereby creating a space between said vacuum plate and said second vacuum plate.

22. The method of claim 21 further comprising the step of varying at least one of a size, a shape, and a configuration of said plurality of openings in said second vacuum plate.

23. The method of claim 18 wherein said step of attaching a mechanism for diverting air comprises the step of attaching at least one separation panel perpendicular to the front of the vehicle.

24. The method of claim 18 wherein said step of attaching a mechanism for diverting air comprises the step of attaching at least one tubular member to the front of the vehicle.

* * * * *